United States Patent [19]

Matsumura et al.

[11] Patent Number: 4,590,563
[45] Date of Patent: May 20, 1986

[54] METHOD AND APPARATUS FOR CONTROLLING INTERNAL COMBUSTION ENGINE

[75] Inventors: Toshimi Matsumura, Aichi; Norio Omori, Kariya; Hisanori Kobayashi, Aichi, all of Japan

[73] Assignee: Nippondenso Co., Ltd., Kariya, Japan

[21] Appl. No.: 427,536

[22] Filed: Sep. 29, 1982

[30] Foreign Application Priority Data

Oct. 14, 1981 [JP] Japan .............................. 56-164841

[51] Int. Cl.⁴ .................... F02D 35/00; F02D 41/26; F02P 5/15
[52] U.S. Cl. .......................... 364/431.05; 364/431.10; 364/558; 123/412; 123/416; 123/488
[58] Field of Search ........................ 364/431.10, 442; 123/412, 416, 424, 463, 465, 488, 491, 494, 198 DB

[56] References Cited

U.S. PATENT DOCUMENTS

| | | | |
|---|---|---|---|
| 4,157,699 | 6/1979 | Mori | 123/424 X |
| 4,192,279 | 3/1980 | Maisch et al. | 123/198 DB |
| 4,271,797 | 6/1981 | McCarbery | 123/412 |
| 4,286,683 | 9/1981 | Zeigner et al. | 364/442 X |
| 4,307,691 | 12/1981 | Nagae et al. | 123/412 X |
| 4,372,274 | 2/1983 | Takase | 123/424 X |
| 4,385,606 | 5/1983 | Hattori et al. | 123/416 |
| 4,416,234 | 11/1983 | Ikeura | 123/424 |
| 4,442,812 | 4/1984 | Mizuno et al. | 123/424 X |

FOREIGN PATENT DOCUMENTS

2069597 8/1981 United Kingdom ............... 123/412

Primary Examiner—Felix D. Gruber
Attorney, Agent, or Firm—Cushman, Darby & Cushman

[57] ABSTRACT

A single pressure sensor is provided to measure the air pressure in the intake manifold of a fuel injection engine. An electronic control unit having a microcomputer is provided to control the fuel amount and ignition timing in accordance with various engine parameters including the engine rotational speed and the intake pressure. The intake pressure is first measured before the engine is started so that the data of this pressure can be used as data indicative of atmospheric pressure. During operation of the engine, the pressure data may be used as normal intake pressure data. However, when the engine operates at a low speed and under high load, the pressure data is used as data indicative of the atmospheric pressure with slight correction. The amount of fuel to be injected and ignition timing thus controlled with updated data of atmospheric pressure, and therefore, undesirable phenomena, which are apt to occur when an engine is operated at a high altitude place, are effectively prevented, resulting in desired air/fuel ratio and ignition timing.

24 Claims, 6 Drawing Figures

METHOD AND APPARATUS FOR CONTROLLING INTERNAL COMBUSTION ENGINE

BACKGROUND OF THE INVENTION

This invention relates generally to method and apparatus for controlling an internal combustion engine in accordance with various information including atmospheric pressure.

As a system for controlling an internal combustion engine, such as motor vehicle engines, is known a speed density control system (referred to as S-D system) in which necessary amount of fuel is calculated using two parameters indicative of the intake air pressure in the intake manifold and the rotational speed of the engine crankshaft.

When an internal combustion engine is controlled with such a conventional S-D system without effecting a feedback control, the air/fuel ratio of the air/fuel mixture supplied to the engine is apt to be deviated toward the lean side when atmospheric pressure (Patm) decreases when a motor vehicle is driven at a high altitude because it cannot be considered that exhaust manifold pressure (Pr) lowers and volumetric efficiency ($\eta v$) increases when the amount of fuel is determined on the basis of only the intake manifold pressure (Pm) and engine speed (N). This fact is indicated by the following formula (1), and as a result of such deviation in air/fuel ratio, the drivability and engine starting condition become poor.

$$\eta v \propto (Pm/Patm) \times [1+(1-Pr/Pm)/(K^{(\epsilon-1)})] \qquad (1)$$

wherein
K is a constant; and
$\epsilon$ is a compression ratio

In order to compensate for such undesirable deviation of the air/fuel ratio toward the lean side, an atmospheric pressure sensor or an exhaust gas pressure sensor has been employed independent of the intake manifold pressure sensor. However, such an engine control system suffers from increase in cost inasmuch as it requires two separate pressure sensors, while high reliability is not insured because of variations in accuracy between two separate sensors.

SUMMARY OF THE INVENTION

The present invention has been developed in order to remove the above-described drawbacks inherent to the conventional engine control system.

It is, therefore, an object of the present invention to provide method and apparatus for controlling an internal combustion engine so that air/fuel ratio of the air/fuel mixture supplied to the engine and ignition timing are controlled in accordance with intake manifold pressure corrected by atmospheric pressure which can be obtained by detecting the pressure in the intake manifold before the engine is started and also when the engine operates in a particular condition. Namely, a single pressure sensor can be used not only as an intake manifold vacuum sensor but also as an atmospheric pressure sensor by reading data therefrom under different engine operational conditions.

Another object of the present invention is to provide such method and apparatus which can update the atmospheric pressure data without stopping the engine. Therefore, when a motor vehicle travels at a high altitude, the intake manifold vacuum data measured by the pressure sensor can be corrected by updated atmospheric pressure so that the air/fuel ratio and ignition timing are controlled irrespective of altitude change.

A further object of the present invention is to provide a low cost engine control apparatus which is reliable.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like reference numerals throughout the drawings.

DETAILED DESCRIPTION OF THE INVENTION

Figure 1:
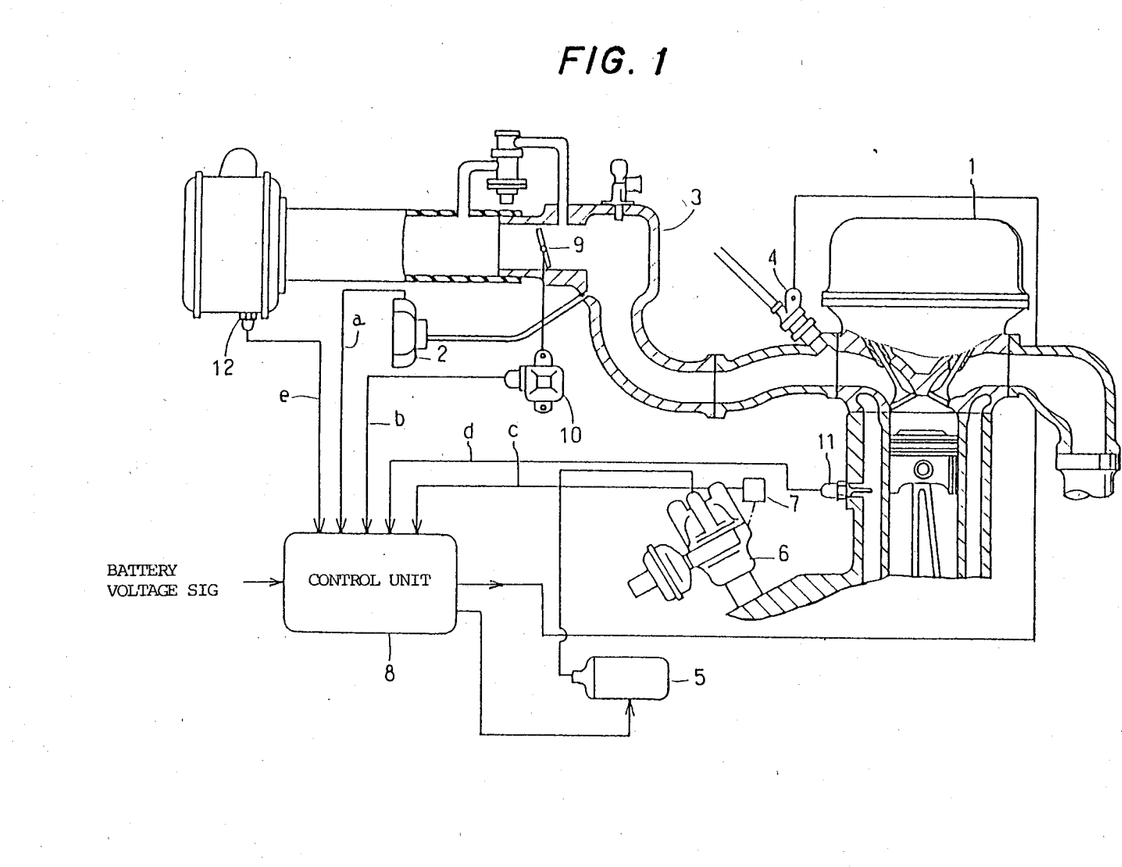
FIG. 1 is a schematic diagram of an embodiment of the apparatus according to the present invention.

Referring to FIG. 1 of the drawings, a schematic illustration of an embodiment of the apparatus for controlling an internal combustion engine is shown. The invention will be described in connection with a 6-cylinder internal combustion engine. The apparatus comprises a semiconductor type intake manifold pressure sensor 2 which is arranged to detect the pressure inside an intake manifold 3. A plurality of fuel injection valves 4 are provided in such a manner that each valve 4 is disposed in the vicinity of an intake port of each cylinder of the engine 1 (only one fuel injection valve 4 is shown for simplicity). The fuel injection valves 4 are of the electromagnetic type and fuel is sent thereto via a conduit under a constant pressure.

An ignition system of the engine 1 comprises an ignition coil 5, a distributor 6 and a plurality of spark plugs (not shown for simplicity). The ignition coil 5 produces a high voltage which is distributed by the distributor 6 to each of the spark plugs provided to each cylinder. The distributor 6 has a rotary shaft (not shown) arranged to rotate once per two revolutions of the engine crankshaft (not shown), and comprises therein a rotational angle sensor 7 for detecting the engine speed. The rotational angle sensor 7 produces a pulse train signal synchronized with the engine revolution, and the number of pulses per unit time will be counted as will be described later to measure the rotational speed of the engine 1.

A throttle sensor 10 is provided to detect whether the throttle valve 9 disposed in the intake manifold 3 is open or closed. Designated at the reference 11 is a coolant temperature sensor attached to the engine casing. The temperature of the engine 1 (i.e., whether it is warmed up) will be detected by the coolant temperature sensor 11. An intake air temperature sensor 12 is provided at an upper stream portion of the intake manifold 3.

An electronic control unit 8 including a microcomputer is provided to control the fuel injection valves 4 and the ignition system. Namely, various values or data from the pressure sensor 2, rotational angle sensor 7, throttle sensor 10, coolant temperature sensor 11, and intake air temperature sensor 12 is fed to the electronic control unit 8 to calculate the necessary amount of fuel to be fed to the engine 1 via the fuel injection valves 4 and necessary ignition timing.

Figure 2:
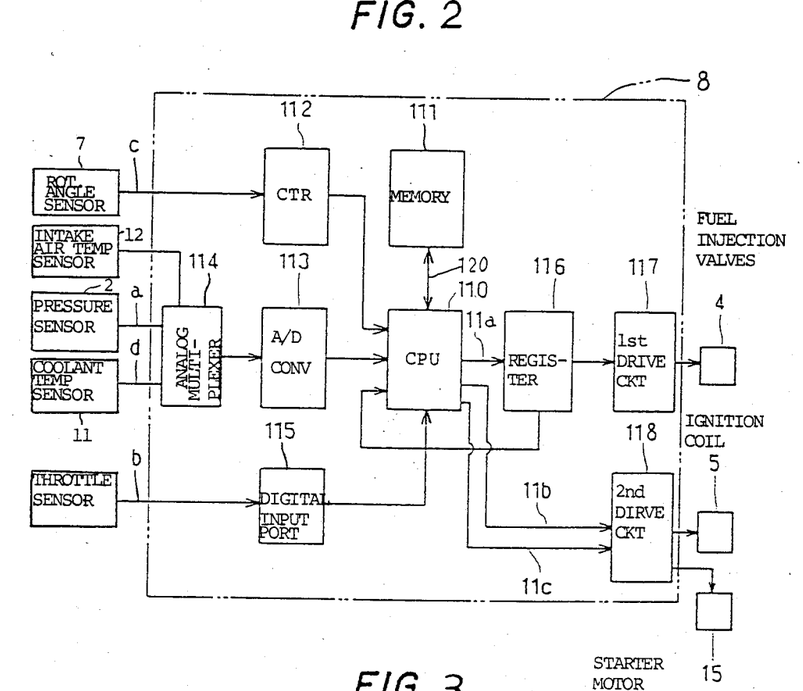
FIG. 2 is a schematic block diagram of the control unit used in the apparatus of FIG. 1.

FIG. 2 shows a block diagram of the electronic control unit 8 of FIG. 1. The electronic control unit comprises a central processing unit (CPU) 110, a memory 111, and various peripheral units. A control program for controlling the engine 1 is prestored in the memory 111, and is arranged to be read out via a bus 120. A counter 112 is provided to measure the rotational speed of the engine 1 in accordance with a signal "c" from the rotational angle sensor built into the distributor 6. The counter 112 comprises a 12-bit binary counter, and is arranged to send an output signal indicative of the rotational speed of the engine 1 through a bus to the CPU 110. An analog multiplexer 114 is connected to the intake manifold pressure sensor 2, the intake air temperature sensor 12, and the coolant temperature sensor 11 so that data indicative of the intake manifold pressure, the intake air temperature, and the coolant temperature is selected to be fed to an A/D converter 113 in which analog data is converted into digital data which is fed to the CPU 110 as input data. The CPU 110 calculates the amount of fuel to be injected in synchronism with the rotation of the engine 1 using mainly rotational speed information (N) from the counter 112 and intake manifold pressure information (Pm) from the A/D converter 113. The CPU 110 finally produces a digital output signal 11a indicative of the results of the above calculation with a correction factor based on coolant temperature information from the A/D converter 113. A digital input port 115 is provided to receive an on-off signal "b" from the throttle sensor 10 so that a throttle valve opening detection signal will be fed to the CPU 110.

A register 116 is provided to receive the output digital signal 11a from the CPU 110, and this digital output is converted into a pulse signal indicative of fuel injection time length or valve opening time of the fuel injection valves 4. The output pulse signal from the register 116 is fed to a first drive circuit 117 which includes an amplifier for amplifying the output pulse from the register 116. The amplified signal or drive signal is then fed to the fuel injection valves 4 to open the same. Lines shown between the counter 112 and the CPU 110, between the A/D converter 113 and the CPU 110, between the digital input port 115 and the CPU 110, and between the register 116 and the CPU 110 are all busses, and these busses may be implemented by using a common bus including the bus 120 between the memory 111 and the CPU 110.

A second drive circuit 118 is responsive to output signals from the CPU 110 to drive the ignition coil 5 and a starter motor 15. The second drive circuit 118 is provided to disable the ignition coil 5 and the starter motor 15 until some data is read by the CPU 110 when an ignition switch (not shown) is turned on. Namely, as will be described in detail later, when the ignition switch is turned on, the CPU 110 initializes various information prestored and immediately after this initialization, first intake manifold pressure information (Pm) from the intake manifold pressure sensor 2 is read. After completion of reading of this information, the ignition coil 5 and the starter motor 15 are made operable.

Figure 3:
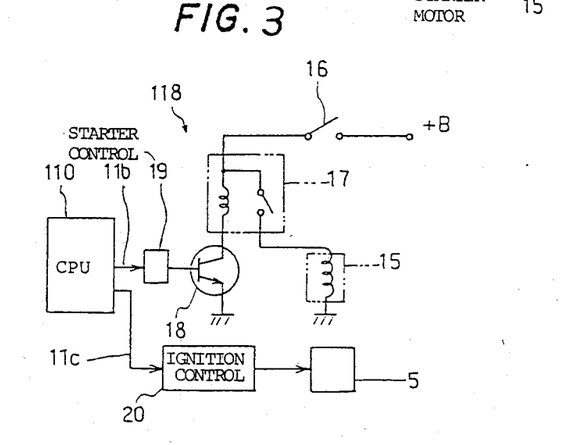
FIG. 3 is a schematic diagram of the second drive circuit used in the control unit of FIG. 2.

FIG. 3 illustrates a schematic diagram of the second drive circuit 118 and its associated elements. In FIG. 3, the reference 16 indicates a starter switch for supplying electrical power +B from an vehicle battery (not shown) to one end of a coil of a starter drive relay 17. The starter switch 16 and the above-mentioned ignition switch are incorporated in key switch (not shown), and the starter switch 16 is arranged to be turned on after the ignition switch is turned on in the same manner as in most conventional motor vehicles. A collector-emitter path of a transistor 18 is interposed between the other end of the coil of the starter drive relay 17 and ground. The starter drive relay 17 comprises a normally-open movable contact connected to the starter switch 16 so that the starter motor 15 receives electrical power via the movable contact of the relay 17 when the relay 17 is energized. A starter control circuit 19 is responsive to an operation permission signal 11b from the CPU 110 for generating a bias signal fed to the base of the transistor 18. Namely, the transistor 18 is rendered conductive only when the operation permission signal 11b is produced by the CPU 110, and thus the starter motor 15 is not supplied with power until the operation permission signal 11b is generated by the CPU 110.

An ignition control circuit 20 is responsive to an ignition command signal 11c from the CPU 110 for producing a drive signal with which the ignition coil 5 is excited. Therefore, the ignition coil 5 does not operate until the ignition command signal 11c is generated by the CPU 110.

Figure 4:
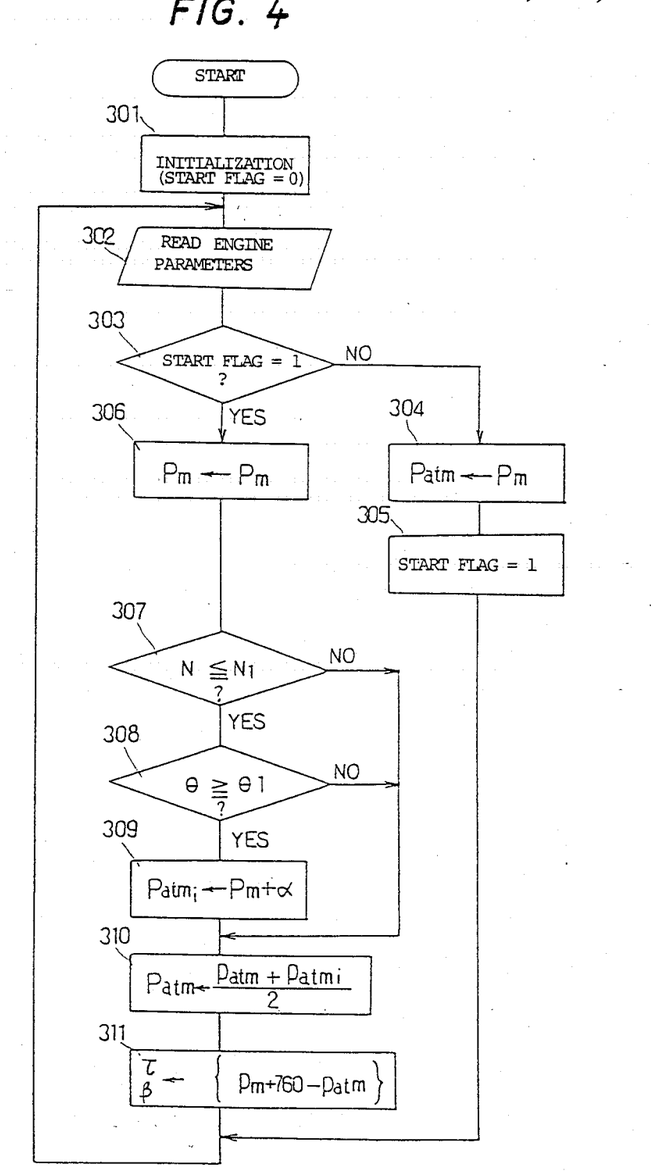
FIG. 4 is a flowchart showing the main routine of the control program of the CPU used in the control unit of FIG. 2.

The operation of the apparatus according to the present invention will be described with reference to a flowchart of FIG. 4 showing a control program for processing pressure information or data. When the ignition switch it turned on, the CPU 110 starts operating and initialization is effected in step 301 as described in the above by setting initial values. At this time, a start flag is set to logic "0" so that the starter motor 15 does not operate until data of atmospheric pressure (Patm) is read once. In a following step 302, various engine parameters, such as coolant temperature, intake air temperature, intake pressure, and engine speed, are read. Then in step 303, it is detected whether the start flag has been reset to "1" or not. Since the start flag has been set to "0" in step 301, the answer of step 303 is NO, so that step 304 is performed. In step 304, the intake manifold pressure Pm is regarded as the atmospheric pressure Patm because no vacuum is produced by the engine 1 when the engine 1 is not operating. Namely, the intake pressure Pm is stored as the atmospheric pressure Patm. Then in step 305, the start flag is reset to "1". A logic "1" value of the start flag indicates that the intake pressure Pm has been stored as the atmospheric pressure Patm. After this, the operational flow returns to the step 302 to read the above-mentioned various engine parameters to be prepared for engine starting.

After step 302, it is detected whether the start flag has been reset to "1" in step 303 again. Since the intake manifold pressure Pm has been read as the atmospheric pressure Patm in step 304 in advance, namely, since the start flag has been reset to "1" in step 305, the answer of step 303 becomes YES. Thus, the intake pressure Pm is stored as a normal intake manifold pressure Pm in step 306.

Steps 307 to 311 following the step 306 are provided to simulate the atmospheric pressure Patm when actual atmospheric pressure varies in a travelling condition of the motor vehicle. Namely, the intake pressure Pm will be used as a value indicative of the atmospheric pressure Patm when the engine operates at a low speed and high load. In step 307, first of all, it is detected whether the engine rotational speed N is equal to or below a predetermined rotational speed N1. In step 308, it is detected whether the opening degree $\theta$ of the throttle valve 9 is equal to or greater than a predetermined opening degree $\theta 1$. Only when both the answers of the steps 307 and 308 are YES, step 309 takes place in which the intake pressure Pm added to a predetermined offset value $\alpha$ is stored as the atmospheric pressure Patmi. Namely, when the engine 1 operates at a low speed ($N \leq N1$) and under high load ($\theta \geq \theta 1$), the pressure Pm in the intake manifold 3 is close to the atmospheric pressure Patmi with a slight difference therebetween. In order to compensate for this difference between the actual atmospheric pressure Patmi and the measured pressure Pm in the intake manifold 3, the above-mentioned offset value $\alpha$ is added to the measured pressure Pm. This offset value $\alpha$ equals the difference, such as 20 to 30 mm Hg, between normal pressure (760 mm Hg) and a predetermined pressure indicative of a typical pressure in the intake manifold 3 obtained when the engine 1 operates at a low speed and under high load.

In step 310, the value of atmospheric pressure Patmi obtained in the above step 309 and the first obtained value of atmospheric pressure Patm in the step 304 are averaged so that variations in measured atmospheric pressure data are compensated for. Namely, Patm and Patmi which have been respectively obtained hitherto are added to each other, and the sum is divided by two to obtain an average value of the atmospheric pressure Patm which will be stored and used as present data or updated data of the atmospheric pressure Patm. This updated data of the atmospheric pressure Patm will be used to further update the atmospheric pressure Patm when step 310 is executed in later cycles.

In step 311, the present data of the atmospheric pressure Patm obtained in step 310 is used for determining a fuel amount correction factor $\tau$ and an ignition timing correction factor $\beta$. Namely, the intake pressure Pm actually measured is corrected by adding the difference between normal pressure (760 mm Hg) and the present atmospheric pressure Patm thereto. Then, the corrected value is added or multiplied by some coefficients to obtain these correction factors $\tau$ and $\beta$. These correction factors $\tau$ and $\beta$ will be used to finally determine the amount of fuel to be injected into engine cylinders and the ignition timing.

In the above-described embodiment, although the first time detection of the intake pressure is performed immediately after the ignition switch is turned on, this detection may be effected at any time as long as the intake pressure is substantially equal to the atmospheric pressure before the engine 1 is started. In other words, the timing for the detection of the intake pressure before engine starting may be derived from other information. For instance, since a door of the motor vehicle must be opened before the vehicle driver gets into the motor vehicle, a signal from a door switch may be used to provide such a timing. Alternatively, a signal from a seat switch, indicative of the presence of a seated driver, may be used. The flowchart of FIG. 4 may be modified by replacing the signal from the ignition switch with another signal from the door switch or seat switch.

Figure 5A:
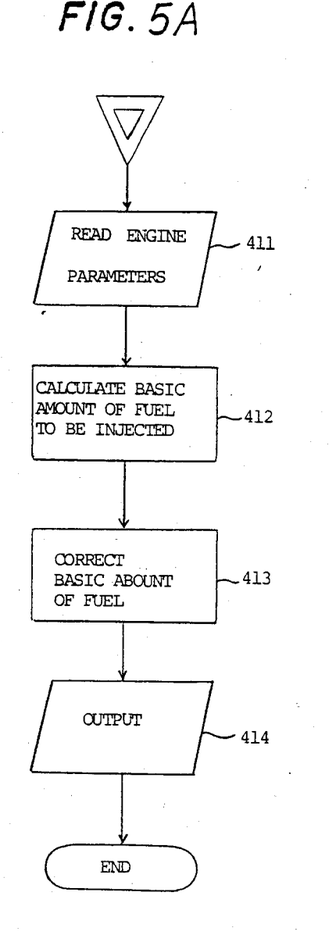
FIGS. 5A and 5B are flowcharts showing two interrupt service routines for the operation of the CPU of FIG. 2.
Figure 5B:
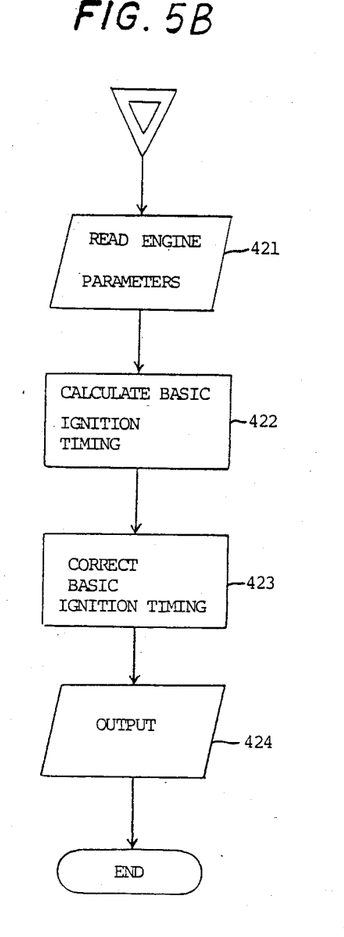

FIGS. 5A and 5B respectively show two flowcharts of interrupt routines for calculating the fuel injection amount and ignition timing. Interrupts are generally arranged to occur in accordance with a signal indicative of a predetermined angle of the engine 1 crankshaft, and in the embodiment of the present invention, the interrupt service routines of FIGS. 5A and 5B are executed in response to interrupt command signals respectively produced when the engine crankshaft assumes first and second predetermined angles.

In the interrupt routine of FIG. 5(A), the fuel amount is calculated. At the beginning, various necessary engine parameters, such as the atmospheric pressure Patm, intake pressure Pm, engine speed N, intake air temperature, coolant temperature, battery voltage etc, are read out in step 411. Then in step 412, a basic fuel amount is calculated on the basis of the intake pressure Pm and the engine speed N using a map stored in the memory 111. In a following step 413, the basic fuel amount is corrected in accordance with various engine parameters to obtain a final amount of fuel. The data indicative of the final fuel amount is output in step 414. This data is fed to the register 116 as the above-mentioned signal 11a so that fuel injection valves 4 are energized to supply a given amount of fuel to maintain the air/fuel ratio at a desirable point, such as the stoichiometric value. In the above step 413, the fuel amount can be corrected to compensate for the deviation of the air/fuel ratio due to variation in atmospheric pressure experienced when the engine 1 is operated at a high altitude place. Namely, the aforementioned first correction factor $\tau$ is used to correct the basic amount of fuel.

In the interrupt service routine of FIG. 5B, the ignition timing of the engine 1 is determined. At the beginning, various necessary engine parameters, such as the intake pressure Pm, engine speed N, coolant temperature etc, are read out in step 421. Then in step 422, a basic ignition timing is calculated on the basis of the engine speed N. In a following step 423, a timing advance angle is obtained so that the basic ignition timing obtained in step 422 is corrected thereby to produce data indicative of final ignition timing. When obtaining the advance angle, the aforementioned second correction factor $\beta$ will be used so that ignition timing will be controlled on the basis of corrected intake pressure. The data indicative of the final ignition timing is output in step 424. This data is fed to the second drive circuit 118 as the above-mentioned operation permission signal signal 11b so that the ignition coil 5 is energized.

From the foregoing description it will be understood that although the microcomputer used in the control unit 8 normally reads the signal indicative of the intake pressure as intake air vacuum pressure data, the pressure data is also read as the atmospheric pressure in the two cases, namely before the engine 1 is started, and when the engine 1 operates at a low speed and under high load. Thus, the apparatus according to the present invention requires only a single pressure sensor, providing a low cost control apparatus. Furthermore, there is no need to consider the variations between two pressure sensors. This enables the control apparatus to be reliable.

In the above embodiment, although the pressure sensor is of the type of measuring absolute pressure, a gauge pressure sensor may also be used.

The above-described embodiment is just an example of the present invention, and therefore, it will be apparent for those skilled in the art that many modifications and variations may be made without departing from the spirit of the present invention.

What is claimed is:

1. A method for controlling an internal combustion engine of the type including starter means for starting the engine, comprising the steps of:
   (1) inhibiting the starter means from starting said engine;
   (2) detecting an initial atmospheric pressure by measuring a signal produced by a single pressure sensor before said engine is started, said single pressure sensor responsive to the intake pressure of said engine;
   (3) generating a start enabling signal after the detection of said initial atmospheric pressure;
   (4) enabling the starter means to start said engine in response to said start enabling signal;
   (5) detecting a predetermined operational condition associated with said engine after said engine has been started;
   (6) detecting the intake pressure of said engine when said engine is operating in said predetermined condition by measuring the signal produced by said single pressure sensor;
   (7) producing an updated atmospheric pressure value from at least said detected initial atmospheric pressure and said detected intake pressure; and
   (8) controlling said engine in accordance with said updated atmospheric pressure value.

2. A method as claimed in claim 1, wherein said predetermined operational condition detecting step comprises the steps of determining whether the rotational speed of said engine is below a predetermined value, and determining whether the opening degree of the throttle valve of said engine is greater than a predetermined value.

3. A method as claimed in claim 1, further comprising a step of adding a predetermined value to said intake pressure to obtain a sum, said updated atmospheric value producing step producing said updated value in accordance with said sum.

4. A method as claimed in claim 1, further comprising a step of correcting the intake pressure measured when said engine is in an operational condition other than said predetermined condition, by said updated atmospheric pressure.

5. A method a claimed in claim 1, further comprising, immediately before said initial atmospheric pressure detecting step, the step of initializing an electronic control unit in response to a supply of power thereto, said control unit performing at least one of said steps 1–7.

6. A method as claimed in claim 1, wherein the step of controlling said engine includes the step of calculating the amount of fuel to be injected to the engine cylinders.

7. A method as claimed in claim 1, wherein the step of controlling said engine includes the step of calculating the ignition timing of said engine.

8. Apparatus for controlling an internal combustion engine of the type including an ignition switch, a starter motor for starting the engine in response to operation of the ignition switch, at least one cylinder, means for controllably injecting fuel into said cylinder, means for intaking air into said cylinder and means for igniting fuel injected into said cylinder, said igniting means including an ignition coil, said apparatus comprising:
   single intake pressure sensor means for producing a value indicating the intake pressure of said engine;
   means for detecting a predetermined operational condition associated with said engine; and
   electronic control means, operatively connected to said pressure sensor means and said condition detecting means, for:
   inhibiting the engine from starting,
   storing an initial atmospheric pressure value produced by said single intake pressure sensor means before said engine is started,
   generating an engine starting signal after said initial atmospheric pressure value is stored,
   enabling the starter motor to start the engine in response to said engine starting signal,
   detecting the intake pressure of said engine when said engine is operating in said predetermined operational condition,
   producing an updated atmospheric pressure value from at least said initial atmospheric pressure and said intake pressure, and
   controlling said engine in accordance with said updated atmospheric pressure value.

9. Apparatus as claimed in claim 8, wherein:
   said condition detecting means comprises means for detecting the rotational speed of said engine, means for detecting intake air temperature of said engine, means for detecting intake air temperature of said engine, means for detecting the coolant temperature of said engine, and means for detecting position of the throttle valve of said engine; and
   said electronic control means comprises:
   a counter responsive to a pulse train signal produced by said rotational speed detecting means,
   an analog multiplexer selectively responsive to said intake air temperature detecting means, said pressure sensor means, and said coolant temperature detecting means,
   analog-to-digital converter means responsive to the output signal from said analog multiplexer for coverting said output signal into a digital signal;
   a digital input port responsive to a signal produced by said throttle valve position detecting means,
   central processing means responsive to output signals from said counter, said analog-to-digital converter means and said digital input port for producing a first output signal indicative of the amount of fuel to be injected into the engine cylinder, a second output signal adapted for permitting said starter motor of said engine to operate, and a third output signal adapted for operating said ignition coil of the ignition system of said engine,
   memory means operatively coupled to said processing means for storing data,
   register means for converting said first output signal into a pulse train signal,
   first drive circuit means responsive to the output signal from said register means for producing output drive signals adapted to be fed to fuel injection means of said engine, and
   second drive circuit means responsive to said second and third output signals for producing first and second electrical currents adapted to be respectively fed to said starter motor and said ignition coil.

10. Apparatus as claimed in claim 8, wherein said predetermined condition detecting means comprises a throttle valve sensor arranged to produce an electrical signal indicative of the opening degree of the throttle valve disposed in the intake manifold, and means for producing a pulse train in synchronism with engine rotation.

11. Apparatus as claimed in claim 10, wherein said electronic control means detects said particular condition of said engine when the rotational speed of said engine is below a predetermined value and the opening degree of the throttle valve of said engine is greater than a predetermined value.

12. Apparatus as claimed in claim 8, wherein said electronic control means is arranged to execute the following calculations for producing said updated atmospheric pressure:

$$Patmi = Pm + \alpha$$

$$Patm' = \frac{Patm + Patmi}{2}$$

wherein
Patmi is a corrected atmospheric pressure value,
Pm is said detected intake pressure,
$\alpha$ is a constant,
Patm' is said updated atmospheric pressure value, and
Patm is said initial atmospheric pressure.

13. Apparatus for controlling an internal combustion engine of the type including an ignition switch, a starter motor for starting the engine in response to operation of the ignition switch, at least one cylinder, means for controllably injecting fuel into said cylinder, means for intaking air into said cylinder and means for igniting fuel injected into said cylinder, said igniting means including an ignition coil, said apparatus comprising:
single intake pressure sensor means for producing a value indicating the intake pressure of said engine;
means for detecting a predetermined operational condition associated with said engine in which the rotational speed is below a predetermined value and the load is greater than a predetermined value; and
electronic control means, operatively connected to said pressure sensor means and said condition detecting means, for:
inhibiting said starter motor from starting said engine,
storing an initial atmospheric pressure value produced by said single intake pressure sensor means before said engine is started,
generating an engine starting signal after said initial atmospheric pressure is stored, said starting signal enabling said starter motor to start said engine,
detecting the intake pressure of said engine when said engine is operating in said predetermined operational condition,
producing an updated atmospheric pressure value from at least said initial atmospheric pressure and said detected intake pressure, and
controlling said engine in accordance with said updated atmospheric pressure value.

14. A method of controlling an internal combustion engine of the type including means for starting said engine in response to actuation of a manual control, comprising:
(1) inhibiting the engine from starting;
(2) measuring the level of the intake air pressure of said engine before said engine is operating;
(3) storing said pressure level measured by said measuring step (2);
(4) subsequent to said storing step (3), enabling said engine to start;
(5) sensing when said engine is operating within a predetermined range of operating conditions;
(6) measuring the level of the intake air pressure of said engine in response to said sensing step (5);
(7) changing the level stored by said storing step (3) in response to the intake air pressure level measured by said measuring step (6); and
(8) controlling said engine in accordance with said stored level as changed by said changing step (7).

15. A method as in claim 14 wherein said controlling step (8) includes the steps of:
controlling the ignition timing of said engine; and
controlling the amount of fuel injected into the cylinders of said engine.

16. A method as in claim 14 further including the steps of:
continually repeating, in sequence, said sensing step (5), measuring step (6), changing step (7), and controlling step (8).

17. A method as in claim 14 wherein said sensing step (5) comprises at least one of:
determining if said engine is operating at a speed below a predetermined speed; and
determining if said engine is driving a load greater than a predetermined load.

18. A method as in claim 14 wherein said sensing step (5) comprises the steps of:
determining if said engine is operating at a speed below a predetermined speed; and
determining whether the degree of opening of a throttle valve of said engine is greater than a predetermined degree.

19. A method as in claim 14 wherein said changing step (7) includes the step of adding a constant value to the value measured by said measuring step (6).

20. A method as in claim 19 wherein said changing step (7) further includes the step of averaging the sum of said constant value and the level measured by said measuring step (7) with the level stored by said storing step (3).

21. A method as in claim 20 further including the steps of:
(a) updating, subsequently to said changing step (7), said stored level in accordance with the average produced by said averaging step; and
(b) continually repeating, the sequence, said sensing step (5), measuring step (6), combining step (7), updating step (a) and controlling step (8).

22. A method for controlling an internal combustion engine of the type including ignition switch means for producing a start signal and starter means for starting said engine in response to said start signal, comprising the steps of:
(1) inhibiting the starter means from starting said engine;
(2) detecting an initial atmospheric pressure by measuring a signal produced by a single pressure sensor before said engine is started, said single pressure sensor responsive to the intake pressure of said engine;
(3) thereafter enabling the starter means to start said engine in response to said starting signal;
(4) after said enabling step (3), detecting an operational condition of said engine in which the rotational speed thereof is below a predetermined value and the loading thereof is greater than a predetermined value;
(5) detecting the intake pressure of said engine when said engine is operating in said operational condition detected by said detecting step (4), including the step of measuring the signal produced by said single pressure sensor;

(6) producing an updated atmospheric pressure value from at least said detected initial atmospheric pressure and said detected intake pressure; and (7) controlling said engine in accordance with said updated atmospheric pressure value.

23. A method for controlling an internal combustion engine of the type including ignition switch means for producing a start signal and starter means for starting said engine in response to said start signal, the method comprising the steps of:

(1) inhibiting the starter means from starting said engine;

(2) detecting an initial atmospheric pressure by measuring a signal produced by a single pressure sensor before said engine is started, said single pressure sensor responsive to the intake pressure of said engine;

(3) generating an enabling signal after the detection of said initial atmospheric pressure;

(4) enabling said starter means to start said engine in response to said enabling signal;

(5) after said enabling step (4), detecting an operational condition of said engine in which the rotational speed thereof is below a predetermined value and the loading thereof is greater than a predetermined value;

(6) detecting the intake pressure of said engine when said engine is operating in said operational condition detected by said detecting step (5), including the step of measuring the signal produced by said single pressure sensor;

(7) producing an updated atmospheric pressure value from at least said detected initial atmospheric pressure and said detected intake pressure; and (8) controlling said engine in accordance with said updated atmospheric pressure value.

24. Apparatus for controlling an internal combustion engine of the type including an ignition switch, a starter motor for starting the engine in response to operation of the ignition switch, at least one cylinder, means for controllably injecting fuel into said cylinder, means for intaking air into said cylinder and means for igniting fuel injected into said cylinder, said igniting means including an ignition coil, said apparatus comprising:

single intake pressure sensor means for producing a value indicating the intake pressure of said engine;

means for detecting a predetermined operational condition associated with said engine in which the rotational speed thereof is below a predetermined value and the loading thereof is greater than a predetermined value; and electronic control means, operatively connected to said pressure sensor means and said condition detecting means, for:

storing an initial atmospheric pressure value produced by said single intake pressure sensor means before said engine is started, detected the intake pressure of said engine when said engine is operating in said predetermined operational condition, producing an updated atmospheric pressure value from at least said initial atmospheric pressure and said detected intake pressure, and controlling said engine in accordance with said updated atmospheric pressure value.

* * * * *